US007055880B2

(12) United States Patent
Archer

(10) Patent No.: US 7,055,880 B2
(45) Date of Patent: Jun. 6, 2006

(54) APPARATUS AND METHOD TO FACILITATE MAINTENANCE OF A WORK VEHICLE

(75) Inventor: Dave Archer, Hortonville, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 270 days.

(21) Appl. No.: 10/171,459

(22) Filed: Jun. 13, 2002

(65) Prior Publication Data

US 2003/0230412 A1 Dec. 18, 2003

(51) Int. Cl.
*B60R 11/06* (2006.01)

(52) U.S. Cl. .................................... 296/37.1; 296/37.6

(58) Field of Classification Search ............... 296/37.1, 296/37.6, 193.04, 203.02, 24.45; 180/69.21, 180/69.24, 287, 291; 169/24; 224/404, 224/542; 29/430, 469
See application file for complete search history.

(56) References Cited

U.S. PATENT DOCUMENTS

| | | | | |
|---|---|---|---|---|
| D122,507 | S | 9/1940 | Grybos | |
| 2,352,379 | A * | 6/1944 | Geertz | 169/24 |
| D205,529 | S | 8/1966 | Palmer | D35/15 |
| 3,493,053 | A * | 2/1970 | Triplett | 169/24 |
| D220,507 | S | 4/1971 | Peterson | D34/15 |
| 3,789,869 | A * | 2/1974 | Morris | D12/13 |
| 4,037,664 | A | 7/1977 | Gibson et al. | 169/15 |
| 4,678,041 | A * | 7/1987 | Staudinger | 296/37.6 |
| D295,506 | S | 5/1988 | Staudinger | D12/13 |
| D299,627 | S | 1/1989 | Staudinger | D12/13 |
| 4,830,421 | A * | 5/1989 | Hawelka et al. | 296/37.6 |
| 4,852,937 | A * | 8/1989 | Lemieux | 296/182.1 |
| 5,000,502 | A * | 3/1991 | Lyall | 296/37.6 |
| D334,547 | S * | 4/1993 | Vestergaard | D12/14 |
| 5,211,245 | A | 5/1993 | Relyea et al. | 269/24 |
| 5,301,756 | A | 4/1994 | Relyea et al. | 169/24 |
| 5,351,512 | A * | 10/1994 | Pearlman | 70/257 |
| 5,553,673 | A * | 9/1996 | Hackman | 169/24 |
| 5,634,487 | A * | 6/1997 | Downey | 137/355.12 |
| D380,992 | S | 7/1997 | McDaniel | D21/133 |
| 5,749,616 | A * | 5/1998 | Steever | 296/37.6 |
| 5,772,271 | A * | 6/1998 | Sanders | 296/37.6 |
| 5,785,372 | A * | 7/1998 | Glatzmeier et al. | 296/24.45 |
| 5,788,158 | A | 8/1998 | Relyea | 239/166 |
| 5,839,664 | A | 11/1998 | Relyea | 239/271 |
| 5,899,276 | A | 5/1999 | Relyea et al. | 169/25 |
| 6,006,841 | A * | 12/1999 | Hunke | 296/37.6 |
| 6,089,639 | A * | 7/2000 | Wojnowski | 296/37.6 |
| 6,139,081 | A * | 10/2000 | Lemieux | 296/37.1 |
| D436,893 | S * | 1/2001 | Kastner et al. | D12/13 |
| 6,394,534 | B1 * | 5/2002 | Dean | 296/181.3 |
| 6,457,764 | B1 * | 10/2002 | Brannon | 296/24.44 |

(Continued)

*Primary Examiner*—Kiran B. Patel
(74) *Attorney, Agent, or Firm*—Foley & Lardner LLP

(57) ABSTRACT

An arrangement of equipment elements to facilitate the maintenance of a work vehicle. The work vehicle has a support structure with a power source mounted on an end of the support structure and a vehicle body mounted on the support structure and enveloping at least a portion of the power source. The arrangement comprises a center compartment located at the rear of the vehicle body and configured to allow access to the power source. A first compartment on one side of the center compartment contains wet equipment elements. A second compartment on another side of the center compartment contains dry equipment elements. Another embodiment of the arrangement of equipment elements to facilitate maintenance includes an additional compartment on a side of the work vehicle proximate to the rear of the work vehicle.

14 Claims, 2 Drawing Sheets

U.S. PATENT DOCUMENTS

| | | | | |
|---|---|---|---|---|
| 6,571,882 | B1 * | 6/2003 | Yen | 169/24 |
| 6,688,664 | B1 * | 2/2004 | Sioutis | 169/24 |
| 2002/0096339 | A1 * | 7/2002 | Yen | 169/24 |
| 2003/0230412 | A1 * | 12/2003 | Archer | 169/24 |
| 2003/0230863 | A1 * | 12/2003 | Archer | 280/99 |
| 2004/0056499 | A1 * | 3/2004 | McNally | 296/37.6 |

* cited by examiner

APPARATUS AND METHOD TO FACILITATE MAINTENANCE OF A WORK VEHICLE

BACKGROUND OF THE INVENTION

This invention relates to vehicles in general and particular to fire-fighting type work vehicles and specifically to an arrangement of equipment elements to facilitate maintenance of the work vehicle.

Prior art vehicles, specifically fire-fighting type of vehicles have a variety of equipment and apparatus utilized during fire-fighting and rescue operations. Such equipment needs periodic maintenance, some on a daily basis. Typical arrangements of such equipment and apparatus results in such elements being located in different parts of the vehicle. Equipment elements such as filters may be located on the side of the vehicle, underneath the vehicle or such other place that is typically convenient for the manufacturer of the vehicle.

However, for purposes of maintenance of such equipment, an operator has to move to different locations on the vehicle in order to maintain the equipment and apparatus, such as changing the filters, checking levels of fluids, making connections to air compressors or batteries and the like. Such procedures are time consuming and inconvenient. Because of space constraints where the work vehicle, such as a fire-fighting crash vehicle, is stored, the vehicle typically has to be moved out of the garage area in order to facilitate the maintenance in or on the various areas of the vehicle.

Thus there is a need for an arrangement of equipment elements that will facilitate the maintenance of such elements on a work vehicle. There is also a need to provide easy access, preferably in one location on the vehicle, to the various day-to-day maintenance items associated with a fire-fighting vehicle.

SUMMARY OF THE INVENTION

There is provided an arrangement of equipment elements to facilitate maintenance of a work vehicle with the vehicle having a power source and a vehicle body. The arrangement comprises at least three access areas in the vehicle body, with each access area configured to provide access to a pre-determined class of equipment associated with the vehicle. Each access area has a door associated with it.

There is also provided a work vehicle comprising a support structure having a rear end and a power source mounted at the rear end of the support structure. A vehicle body is mounted on the support structure and enveloping at least a portion of the power source. The body is configured with at least three access areas in the vehicle body. Each access area is configured to provide access to a predetermined class of equipment associated with the vehicle. A door is associated with each access area.

There is further provided an arrangement of equipment elements to facilitate the maintenance of a work vehicle. The work vehicle includes a support structure, a plurality of wheels coupled to the support structure with each wheel coupled to a modular independent suspension, a power source mounted on an end of the support structure, and a vehicle body mounted on the support structure and enveloping at least a portion of the power source. The arrangement comprises a center compartment located at the rear of the vehicle body and configured to allow access to the power source. A first compartment on one side of the center compartment contains wet equipment elements. A second compartment on another side of the center compartment contains dry equipment elements. Another embodiment of the arrangement of equipment elements to facilitate maintenance includes an additional compartment on a side of the work vehicle proximate to the rear of the work vehicle. Another embodiment of the arrangement of equipment elements to facilitate maintenance includes a data bus mounted in the work vehicle and coupled to a transducer coupled to an equipment element and a monitor.

There is also provided a work vehicle comprising a support structure having a rear end with a power source mounted at the rear end of the support structure. A vehicle body is mounted on the support structure and enveloping at least a portion of the power source with the body configured with a center compartment allowing access to the power source. A first compartment on one side of the center compartment and a second compartment on the other side of the center compartment. Another embodiment of the work vehicle includes an additional compartment on the side of the work vehicle proximate the rear end of the work vehicle. The compartments are configured to house various equipment elements. Another embodiment includes a plurality of wheels coupled to the support structure, with each wheel coupled to a modular independent suspension. Another embodiment of the work vehicle is the work vehicle configured as a fire-fighting vehicle. Another embodiment of the work vehicle is configured as a crash truck.

Additionally, there is provided a method to facilitate maintenance of equipment on a work vehicle with the work vehicle having a body, a power source, a support structure, and a plurality of wheels coupled to the support structure, with each wheel coupled to a modular independent suspension. The method comprises steps of mounting the power source on the support structure at the rear of the work vehicle. Configuring the body of the work vehicle to provide access to the power source through a center compartment. Configuring the body of the work vehicle to provide access to a first compartment on one side of the center compartment. Configuring the body of the work vehicle to provide access to a second compartment on another side of the center compartment. Installing wet equipment elements in the first compartment and installing dry equipment elements in the second compartment. Maintenance of the equipment elements and power source is performed in each of the respective compartments. Another embodiment of the method includes the step of configuring the body of the work vehicle to allow access to an additional compartment on the side of the work vehicle proximate the rear end of the work vehicle. Another embodiment of the method includes the step of monitoring the status of the equipment elements with associated transducers coupled to a data bus mounted in the work vehicle.

DETAILED DESCRIPTION OF THE EXEMPLARY EMBODIMENTS

Figure 1:
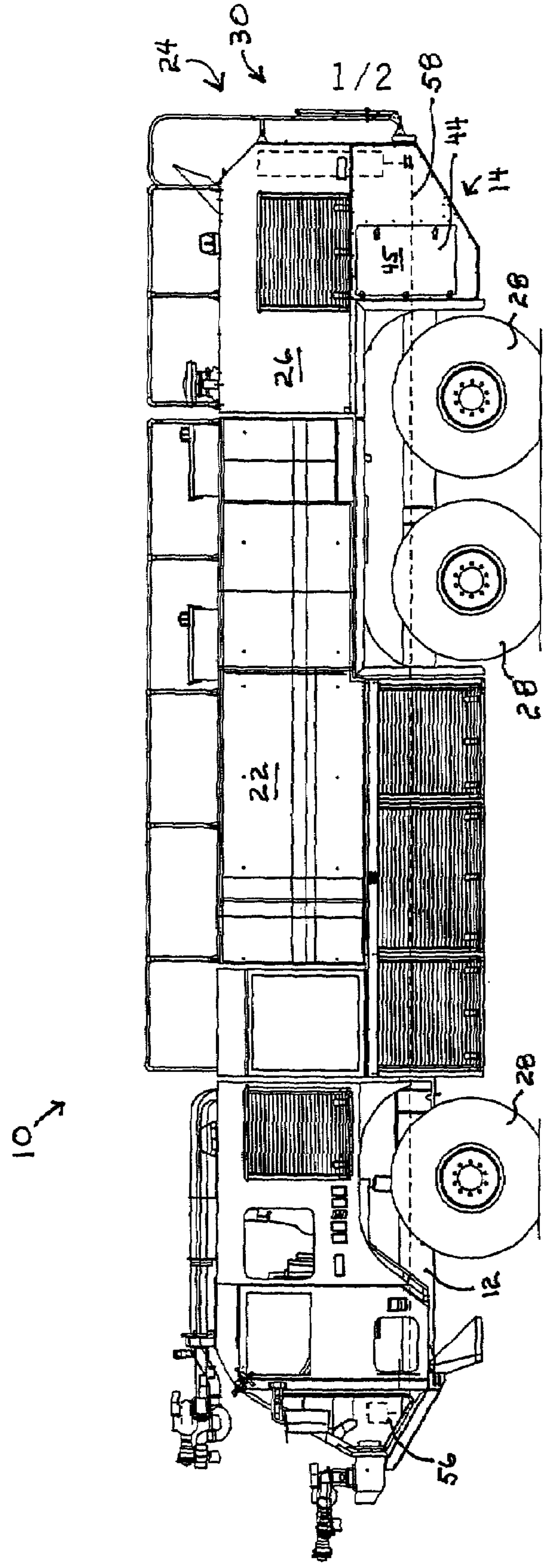
FIG. 1 is a plan side view of a crash truck type fire-fighting work vehicle including an embodiment of an arrangement of equipment to facilitate maintenance of the vehicle.

Before discussing an exemplary embodiment of an arrangement 30 of equipment elements to facilitate maintenance of a work vehicle 10, there are a few preliminary comments. When referring to a work vehicle 10, it is contemplated that a vehicle 10 can be of several different uses and it is referred to a work vehicle 10, a fire-fighting vehicle 10, a crash truck 10, a multi-wheel vehicle 10 and the like. It is also contemplated that articulated tracks mounted on the wheels can be used as support for the support structure 12 of a vehicle 10. The vehicle 10 also typically has an area designated as a vehicle body 22, a vehicle side 26 (typically two sides) and a rear 24. It is contemplated that any convenient and conventional materials can be utilized for such vehicle portions commensurate with the type duty that will be experienced by the vehicle. For example, the body can be made out of steel, aluminum, or composite materials. The wheels can be cast or machined. The wheel arrangement can be a four-wheel, six-wheel (two tandem wheel sets at the rear of the vehicle as illustrated in FIG. 1) and eight-wheel vehicle.

A fluid source can be mounted directly on the work vehicle 10, can be towed on a separate trailer structure or can be a fixed fluid source such as a lake, river or tank. For example, if the work vehicle 10 is configured as a fire-fighting vehicle, the fluid source is typically mounted on the vehicle 10, or the vehicle 10 can be brought to an independent fluid source which then utilizes the vehicle for pumping purposes.

As discussed above, the work vehicle 10 can be a fire truck or a crash truck. For this application, a fire truck means a municipal fire truck equipped to fight structural building fires and typically is not considered an off-road vehicle. For this application, a crash truck means an airport rescue fire-fighting vehicle equipped to fight aircraft fires and fuel fires. The crash truck is configured for off-road use. A typical application of a fire-fighting or crash truck utilized at an airport is for it to be called upon in the event of an airplane crash at or near the airport.

Referring now to the figures, FIG. 1 illustrates a plan side view of a work vehicle 10 such as a fire-fighting, crash truck. The work vehicle 10 has a support structure 12 coupled to a plurality of wheels 28. A power source 16 is mounted at an end 14 of the support structure 12. A vehicle body 22 is mounted on the support structure 12 and envelopes at least a portion of the power source.

Each wheel 28 is coupled to a modular independent suspension 29. (See FIGS. 2 and 3) The modular independent suspension 29 includes a coil spring for steerable and non-steerable wheel assemblies and drive and non-drive axles. The modular independent suspension 29 is coupled to the support structure and to each wheel 28 and wheel assembly of the fire-fighting vehicle 10. An example of such modular independent suspension 29 is more fully described in U.S. Pat. Nos. 5,538,274 and 5,820,150 commonly assigned to the assignee of the present application. Such disclosures are incorporated herein by this reference.

Figure 2:
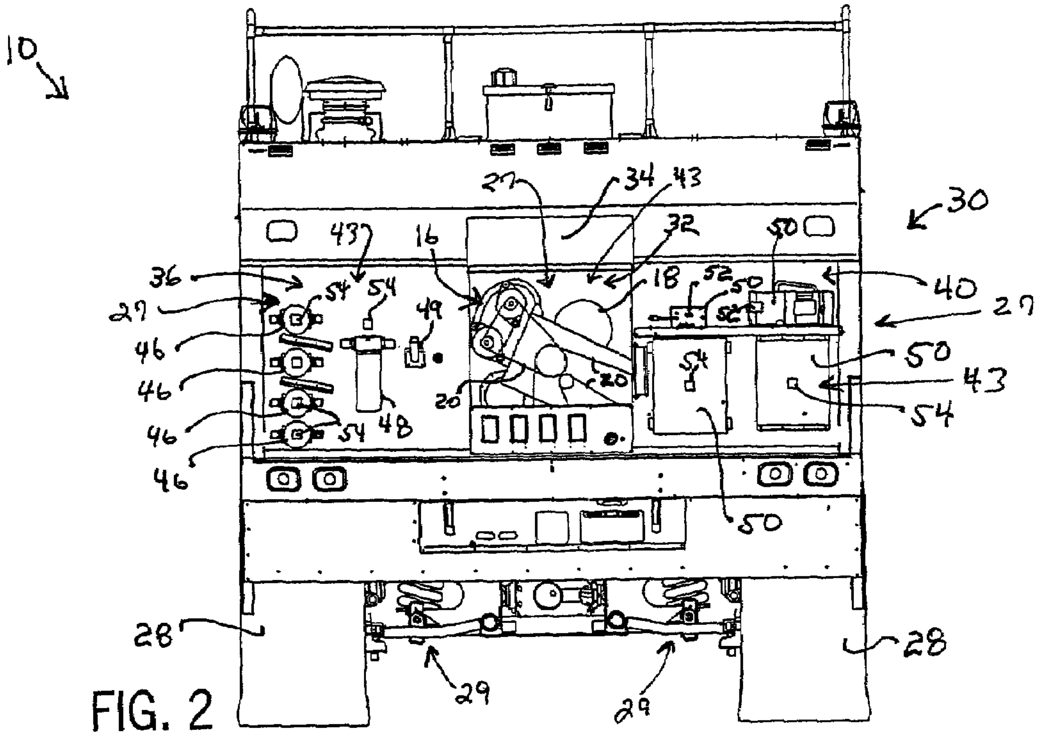
FIG. 2 is a plan end view of the vehicle illustrated in FIG. 1 illustrating an embodiment of an arrangement of equipment to facilitate maintenance in an open first, center and second compartments exposing various equipment elements.
Figure 3:
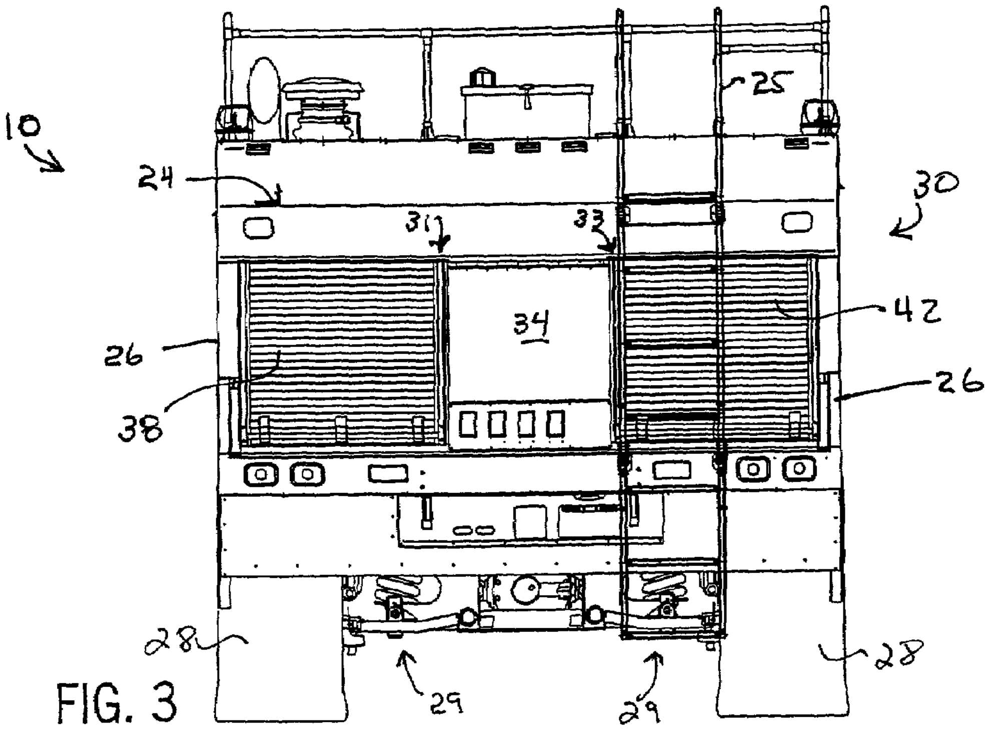
FIG. 3 is a plan end view of the vehicle illustrated in FIG. 2 with the first and second compartments closed with a roller-type door and the center compartment closed with a hinged door.

An arrangement 30 of equipment elements to facilitate maintenance of a work vehicle 10 is illustrated in FIGS. 2 and 3. The rear 24 of the vehicle body 22 is configured with at least three access areas 27. Each access area 27 is configured to provide access to a pre-determined class of equipment 43 associated with the vehicle 10. The access areas can be contiguous.

One exemplary embodiment of such arrangement 30 provides a center compartment 32, a first compartment 36 and a second compartment 40. The center compartment 32 is configured to allow access to the power source 16. The first compartment 36 is on one side 31 of the center compartment 32 and contains wet equipment elements 46. The second compartment 40 is on another side 33 of the center compartment 32 and contains dry equipment elements 50. The vehicle body 22 can also be configured with an additional compartment 44 on a side 26 of the work vehicle 10 proximate the rear end 24 of the work vehicle 10.

The arrangement 30 of equipment elements to facilitate maintenance of the work vehicle 10 includes separating what the applicant considers a pre-determined class of equipment, for example wet equipment elements 46 and dry equipment elements 50 into respective area 27 compartments as described above. With this arrangement 30, an operator can go to one area, or compartment, to check or maintain the particular equipment elements housed in the particular compartment 32, 36, 40, 44.

For purposes of this application, wet equipment elements 46 means equipment elements associated with a fluid utilized on the work vehicle 10. For example, engine oil and transmission oil filters and fill pipes, hydraulic filters such as for a fluid nozzle, fan hydraulics, steering hydraulics and the like which utilize filters 48 and fill pipes 49 are contained in one compartment. As is illustrated in FIG. 2 such wet equipment elements 46 are contained in the first compartment 36. It should be understood and it is contemplated that other types of wet equipment elements 46 can be housed in the first compartment 36 including a sub-compartment for designated equipment.

For purposes of this application, dry equipment elements 50 means equipment elements associated with non-liquid equipment. For example, an air compressor, a battery charger, a power distribution panel, and A/C electric distribution panel and transmission ECU. As illustrated in FIG. 2, such dry equipment elements 50 are housed in the second compartment 40. It should be understood and it is contemplated that other types of dry equipment elements 50 can be housed in the second compartment 40 including a sub-compartment for designated equipment.

It should be noted that the equipment elements can be housed in either compartment and not limited to the arrangement illustrated in FIG. 2. Other configurations are possible and the manufacturer or user can designate such other arrangements that are suitable for the particular use of the work vehicle 10.

Access to the power source 16, which typically is a diesel engine, but can be a gasoline powered internal combustion engine or a turbine engine or the like, is provided at the center compartment 32 as illustrated in FIG. 2. By mounting the power source 16 at the end 14 of the support structure 12 and providing the access to the power source 16 through the center compartment 32 of the vehicle body 22, maintenance and checking of the power source 16 is easily facilitated. For instance, the belts 20 which drive various components of equipment, for example a pump, an alternator or the like, of the work vehicle 10 are readily accessible through the center compartment 32. Another embodiment includes a hybrid electric system power source 16. In such vehicle 10, the power source 16 is coupled to each wheel 28 and is proximate to each wheel 28. The center compartment 32 can then be used to access other equipment associated with the vehicle 10, such as an equipment cooling fan.

As mentioned above, another embodiment of the arrangement 30 of equipment elements facilitate maintenance of a work vehicle 10 includes an additional compartment 44 on a side 26 of the work vehicle 10 proximate the rear 24 of the work vehicle 10 as best seen in FIG. 1. A typical utilization of such additional compartment 44 would, for example, include a storage tank for hydraulic fluid utilized on the work vehicle including a fill tube. Such additional compartment can be on either or both sides 26 of the work vehicle 10 and can house such other equipment elements as determined by the manufacturer or user of the work vehicle 10.

FIG. 3 illustrates the arrangement 30 of equipment elements with the several compartments 32, 36, 40 closed. As illustrated in FIG. 3, the first compartment 36 and the second compartment 40 are closed with a roller-type doors 38, 42. The center compartment 32 is closed with a hinged door 34. The center compartment hinge is located at the top of the door allowing the door to swing up and not block either the first 36 or second 40 compartment. The additional compartment 44 also is provided with a hinged door 45, however, as illustrated in FIG. 1, the hinge is on a side of the door. A roller-type door can also be used.

FIG. 3 also illustrates a ladder 25 coupled to the vehicle body 22 to facilitate access to the top portion of the work vehicle 10. Additional equipment maintenance items may be located on the top of the vehicle body 22 and access to such equipment is facilitated by the ladder 25.

Another embodiment of the arrangement of equipment elements 30 to facilitate maintenance of the work vehicle 10 includes utilization of a control system including a transducer 54 and monitor 56 coupled to a data bus 58 which is mounted in the work vehicle 10.

The control system for controlling the transducer 54 or an actuator is shown in FIG. 1. The control system comprises a plurality of interface modules which use input status information from a plurality of input devices to control a plurality of output devices or monitor the status of selected equipment elements 46, 50. The input devices and the output devices may be a combination of analog and digital 10 devices. The interface modules are distributed throughout the vehicle 10 and are connected to each other by way of a communication network or data bus 58 and a monitor 56. Each of the interface modules is also connected to a power bus. The transducer 54 can be of any convenient and conventional type for monitoring various equipment elements on the work vehicle 10.

To control the output devices, the interface modules gather I/O status information locally and from other interface modules in the control system. Preferably, an I/O status broadcasting scheme is employed in which each interface module gathers input status information from the input devices to which it is connected, combines the input status information with output status information for the output devices to which it is connected, and then broadcasts the complete set of local I/O status information at regular intervals over the data bus 58. Therefore I/O status information for all of the input devices and the output devices in the control system is broadcast at regular intervals over the data bus 58. Each interface module receives the I/O status broadcasts from the remaining interface modules and stores the complete set of I/O status information in an I/O status table, which is dynamically updated based on the I/O status broadcasts. Based on the information in the I/O status table, the interface module controls the output devices. For example, a pressure gauge can be coupled to a filter 48 or other wet equipment element 46 to measure the pressure exerted on the filter 48. Such measurement data is transmitted over the data bus 58 to a monitor 56, which monitor is typically mounted in the cab of the vehicle 10. It is contemplated that the monitor 56 can be mounted at the rear end 24 of the body of the vehicle. It is also contemplated that the monitor 56 can be a data transfer interface terminal suitable for coupling to an external monitor such as a computer. The transducer 54 can also be a current transformer or a resistor or such other monitoring device that is coupled to the data bus 58 to transmit a signal to the monitor 56 to facilitate the maintenance of the work vehicle 10.

There is also provided a method to facilitate maintenance of equipment on a work vehicle 10 with the work vehicle 10 having a body 22, a power source 16, a support structure 12, and a plurality of wheels 28 coupled to the support structure 12, with each wheel 28 coupled to a modular independent suspension 29. The method comprises the steps of mounting the power source 16 on the support structure 12 at the rear 14 of the support structure of the work vehicle 10. Configuring the body 22 of the work vehicle 10 to provide access to the power source 16 through a center compartment 32. Configuring the body 22 of the work vehicle 10 to provide access to a first compartment 36 on one side 31 of the center compartment 32. Configuring the body 22 of the work vehicle 10 to provide access to a second compartment 40 on another side 33 of the center compartment 32. Installing wet equipment elements 46 in the first compartment 36 and installing dry equipment elements 50 in the second compartment 40. Wherein maintenance of the equipment elements 46, 50 and the power source 16 is performed in each of the respective compartments 32, 36, 40.

The method can also include the step of changing filters 48 installed in the first compartment 36. The method can also include the step of changing belts 20 installed on the power source 16 in the center compartment 32. The method can also include the step of manipulating and adjusting electrical components 52, such as switches and dials, in the second compartment 40. The method can also include the step of configuring the body 22 of the work vehicle 10 to allow access to an additional compartment 44 on a side 26 of the work vehicle 10 proximate the rear 24 of the work vehicle 10. Another embodiment can include the step of servicing equipment in the additional compartment 44 on the side 26 of the work vehicle 10. The methods can also include the step of monitoring the status of the equipment elements 46, 50 with associated transducers 54 coupled to a data bus 58 mounted in the work vehicle 10.

The method can be utilized in a work vehicle 10 that is configured as a fire-fighting vehicle. The method can be utilized when the fire-fighting vehicle is configured as a crash truck.

Thus there is provided an apparatus and method of equipment elements to facilitate maintenance of a work vehicle. One of the embodiments illustrated in the figures and described above, are presently preferred, it should be understood that these embodiments are offered by way of example only. The invention is not intended to be limited to any particular embodiment but is intended to extend to various modifications that nevertheless fall within the scope of the appended claims. Additional modifications will be evident to those with ordinary skill in the art.

What is claimed is:

1. An arrangement of equipment elements on a vehicle to facilitate maintenance of the vehicle, the arrangement comprising:

a wet equipment compartment containing wet equipment elements, with a cover at the rear end of the vehicle to facilitate maintenance;

a dry equipment compartment containing dry equipment elements, with a cover at the rear end of the vehicle to facilitate maintenance; and a power source compartment containing a power source for the vehicle, with a cover at the rear end of the vehicle to facilitate maintenance.

2. The arrangement of claim 1 wherein the wet equipment compartment is adjacent to the power source compartment.

3. The arrangement of claim 2 wherein the dry equipment compartment is adjacent to the power source compartment.

4. The arrangement of claim 1 wherein the power source is an internal combustion engine.

5. The arrangement of claim 4 wherein the wet equipment elements comprise a filter and a fill pipe for at least one of engine oil, transmission oil and hydraulic fluid.

6. The arrangement of claim 1 wherein the dry equipment elements comprise at least one of an air compressor, a battery charger and a power distribution panel.

7. The arrangement of claim 1 further comprising a transducer disposed in at least one of the dry equipment compartment and the wet equipment compartment and the power source compartment and operable to monitor at least one of a dry equipment element and a wet equipment element and the power source and provide data to a monitor in the vehicle.

8. The arrangement of claim 1 wherein the wet equipment elements are accessible through a first opening in the rear end of the vehicle and the dry equipment elements are accessible through a second opening in the rear end of the vehicle and the power source is accessible through a third opening in the rear end of the vehicle and any one of the wet equipment elements and the dry equipment elements and the power source can be accessed for maintenance through its respective opening from the rear end of the vehicle without entering the other openings.

9. The arrangement of claim 1 wherein the power source comprises a hybrid electric system.

10. The arrangement of claim 1 wherein the wet equipment compartment and the dry equipment compartment and the power source compartment are contiguous.

11. The arrangement of claim 1, wherein the covers comprise a roller-type door.

12. The arrangement of claim 1, including an additional access area on a side of the vehicle, proximate the rear end of the vehicle.

13. The arrangement of claim 1, wherein the vehicle is a fire-fighting vehicle.

14. The arrangement of claim 13, wherein the fire-fighting vehicle is a crash truck.

* * * * *